(12) United States Patent
Ju et al.

(10) Patent No.: US 6,249,910 B1
(45) Date of Patent: Jun. 19, 2001

(54) APPARATUS AND METHOD FOR INCREMENTALLY UPDATE STATIC SINGLE ASSIGNMENT FORM FOR CLONED VARIABLE NAME DEFINITIONS

(75) Inventors: Dz-ching Ju, Sunnyvale; David Mitford Gillies; A. V. S. Sastry, both of San Jose, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/072,282

(22) Filed: May 4, 1998

(51) Int. Cl.$^7$ ........................................................ G06F 9/45
(52) U.S. Cl. ........................................ 717/9; 717/4; 717/8
(58) Field of Search .................................. 395/709, 701, 395/707; 712/245; 717/9, 1, 7, 4, 8

(56) References Cited

U.S. PATENT DOCUMENTS

| | | | |
|---|---|---|---|
| 5,293,631 | * | 3/1994 | Rau et al. .................................. 717/7 |
| 5,327,561 | * | 7/1994 | Choi et al. ................................. 717/9 |
| 5,448,734 | * | 9/1995 | Burke et al. .......................... 709/314 |
| 5,659,754 | * | 8/1997 | Grove et al. .............................. 717/9 |
| 5,724,565 | * | 3/1998 | Dubey et al. ......................... 712/245 |
| 5,768,596 | * | 6/1998 | Chow et al. .............................. 717/9 |
| 5,920,716 | * | 7/1999 | Johnson et al. ........................... 717/1 |
| 5,978,588 | * | 11/1999 | Wallace .................................... 717/9 |
| 5,991,540 | * | 11/1999 | Radigan ................................... 717/9 |
| 6,029,005 | * | 11/1999 | Radigan ................................... 717/9 |

OTHER PUBLICATIONS

"Incremental Computation of Static Single Assignment Form" IBM Corporation Jong–Deok Choi et al., Nov. 1995.*

"Efficiently Computing Static Single Assignment Form and the Control Dependence Graph" R Cytron et al IBM Research, Oct. 1991.*

Choi, Jong–Deok, et al.; Incremental Computation Of Static Single Assignment Form; Nov. 1995; Technical Report TR ADTI–1995–019, published by IBM, Software Solutions Division, Application Development Technology Institute, San Jose California.

Cyton, Ron, et.; Efficiently Computing Static Single Assignment Form And The Control Dependence Graph; published ACM Transactions on Programming Languages and Systems, vol. 13, No. 4, Oct. 1991, pp. 451–990.

* cited by examiner

Primary Examiner—Mark R. Powell
Assistant Examiner—Hoang-Vu Antony Nguyen-Ba
(74) Attorney, Agent, or Firm—Clare T. Hartnett

(57) ABSTRACT

An improved technique for incrementally updating a source code representation having cloned variable name definitions to static single assignment (SSA) form is described. The technique receives an intermediate representation of a source program in non-SSA form having one or more cloned variable name definitions that correspond to an original variable name. All the original variable names and their corresponding cloned variable names are collected. An iterative dominance frontier set for those nodes containing a cloned variable name definition or an original variable name definition is formed. This iterative dominance frontier set is then used to determine the nodes in which a single phi-function is inserted for each original variable name. Each use of an original variable name is changed to the cloned variable name that reaches the use. The arguments of the inserted phi-functions are then updated with the cloned variable names that reach the inserted phi-functions. Finally, all dead instructions including the original variable definitions, redundant cloned variable definitions, and redundant inserted phi-functions are eliminated.

24 Claims, 12 Drawing Sheets

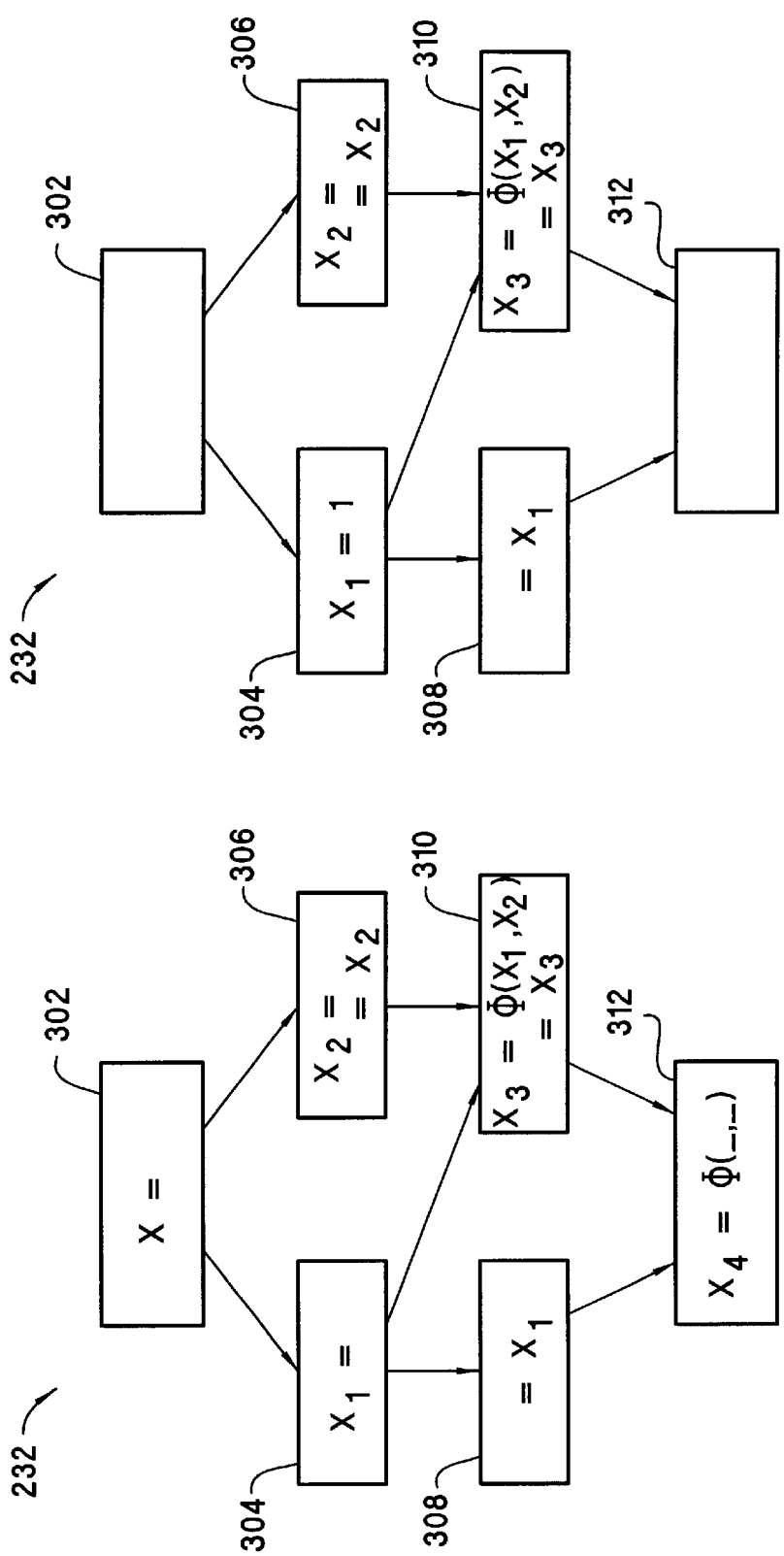

APPARATUS AND METHOD FOR INCREMENTALLY UPDATE STATIC SINGLE ASSIGNMENT FORM FOR CLONED VARIABLE NAME DEFINITIONS

FIELD OF THE INVENTION

The present invention relates generally to compiler technology. More particularly, the invention relates to incrementally updating static single assignment (SSA) form for cloned variable name definitions.

BACKGROUND OF THE INVENTION

Most compilers perform optimizations on a source program in order to produce object code that executes faster and which consumes minimal memory space. SSA is an intermediate representation of a source program that is typically used during the optimization phase of a compiler. The SSA form requires each program variable to be defined only once. This form is simpler and efficient for use in several optimizations, such as register promotion, loop unrolling, code motion, constant propagation, dead code elimination, partial redundancy elimination, and the like.

FIG. 1A illustrates a control flow graph 100 depicting the intermediate representation of a source program. The variable, x, is defined in nodes 102, 104 and used in nodes 106, 108. A definition is an instruction that assigns a value to a variable (e.g., "x=") and a use is an instruction that uses the value assigned to the variable (e.g., "=x"). Since the variable, x, is defined more than once, the intermediate representation is not in SSA form.

In order to represent a source program in SSA form, a variable is represented by one or more cloned variable names. A phi-function (Φ-function) is used at join points to define a cloned variable name that represents the definitions of the variable and the associated cloned variable name definitions that can reach the join point.

FIG. 1B shows the control graph 100 in SSA form. There are multiple cloned variable names representing x: a first cloned variable name, $x_1$, is defined in node 102 and is used in nodes 106, 108; a second cloned variable name, $x_2$, is defined in node 104 and used in node 108; and a third cloned variable name, $x_3$, is defined and used in node 108. The phi-function ($\Phi(x_1,x_2)$) in join node 108 is used to indicate the definitions of x that reach the join node 108. The cloned variable name $x_3$ is assigned the definition that reaches the join node 108, which in this case can be either $x_1$ or $x_2$. The multiple cloned variable names $x_1$, $x_2$, $x_3$ are used to conform the intermediate representation to SSA form. The variable x is replaced by the multiple cloned variable names, $x_1$, $x_2$, $x_3$, each of which is defined only once thereby satisfying the SSA form.

A compiler can perform one or more optimization phases where each optimization phase can leave the intermediate representation in non-SSA form. The task of reconstructing the entire program into the SSA form after each optimization phase is time consuming and expensive. For this reason, incremental SSA update techniques have been proposed. The incremental SSA update techniques reconstruct portions of a program that were affected by a particular optimization technique into SSA form after the optimization occurs. The incremental SSA update techniques avoid reconstructing the entire program after each optimization is performed. However, the incremental SSA update techniques need to be efficient in order to be practical for commercial implementations.

SUMMARY OF THE INVENTION

The present invention pertains to an apparatus and a method for incrementally updating a source code representation having cloned variable name definitions to static single assignment (SSA) form. A source program is processed by a compiler to produce a target program that is executed on a computer. The compiler can represent the source program in an intermediate code representation to which one or more optimizations or program transformations are applied. The SSA form is used by the program transformations and at times the application of a program transformation can result in non-SSA form. The incremental SSA update apparatus and method described herein transforms the intermediate code representation back into the SSA form so that additional processing can be performed.

The incremental SSA update procedure receives an intermediate representation of a source program in non-SSA form having one or more cloned variable name definitions that correspond to an original variable name. The intermediate representation includes a control flow graph having nodes representing basic blocks. Each node includes instructions that use or define variables. A definition or definition instruction is an instruction that assigns a value to a variable and a use or use instruction is an instruction that uses the value assigned to the variable. The incremental SSA update procedure renames each definition of an original variable name with a new cloned variable name in order to ensure that there is only one definition associated with each name. The original variable name is effectively replaced by the multiple cloned variable names.

The incremental SSA update procedure collects an original variable name and its corresponding cloned variable names. An iterative dominance frontier set is formed for the nodes containing cloned variable name definitions and an original variable name definition. A single phi-function is inserted in each node in the iterative dominance frontier set and is assigned to a new cloned variable name. The calculation of the iterative dominance frontier set is computed only once since all the names are considered simultaneously. In addition, only a single phi-function is inserted for each node in the iterative dominance frontier set thereby eliminating unnecessary duplicates.

The incremental SSA update procedure proceeds to alter each use of an original variable name to the cloned variable name that reaches the use. The arguments of the inserted phi-functions are then updated with the cloned variable names that reach the inserted phi-functions. Finally, the method eliminates all dead instructions including the original variable definitions, redundant cloned variable definitions, and redundant inserted phi-functions. By eliminating each of these names simultaneously, the method guarantees that no new dead instructions remain which may have been inserted by either the program transformation or the incremental SSA update procedure.

An advantage of each of these above mentioned improvements is a reduction in the compilation time and in the amount of memory space required for the compilation process. The computational efficiency reduces the overhead expense incurred in using the apparatus and method thereby making its use practical for commercial implementations of any compilation or optimization process.

BRIEF DESCRIPTION OF THE DRAWINGS

For a better understanding of the nature and objects of the invention, reference should be made to the following detailed description taken in conjunction with the accompanying drawings, in which:

FIGS. 5A–5F illustrate an exemplary source program showing the operation of the incremental SSA update procedure in accordance with a preferred embodiment of the present invention.

Like reference numerals refer to corresponding parts throughout the several views of the drawings.

DETAILED DESCRIPTION OF THE INVENTION

Figure 1B:
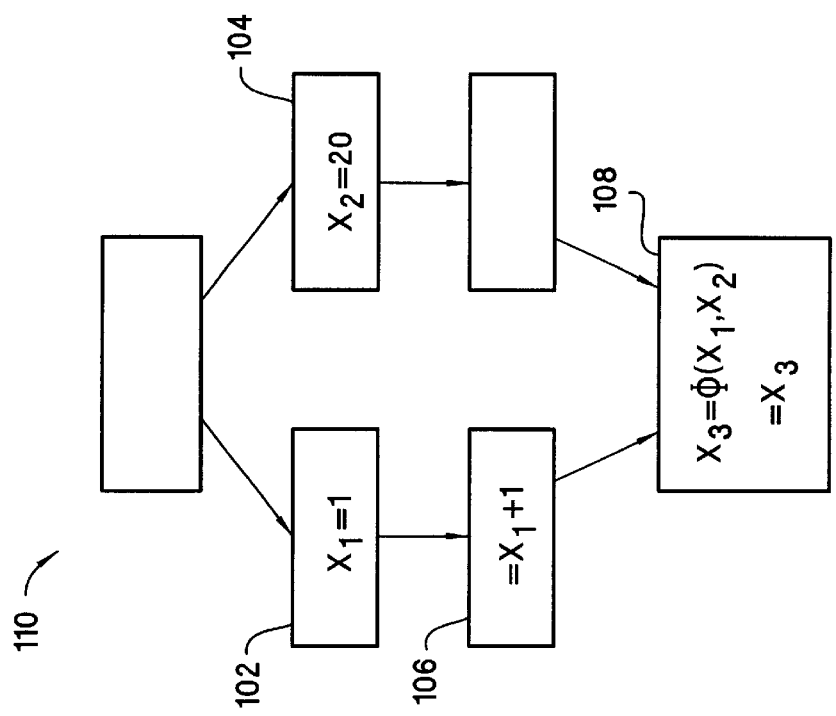
FIG. 1B illustrates a control flow graph representing the exemplary source program of FIG. 1A in SSA form.
Figure 1A:
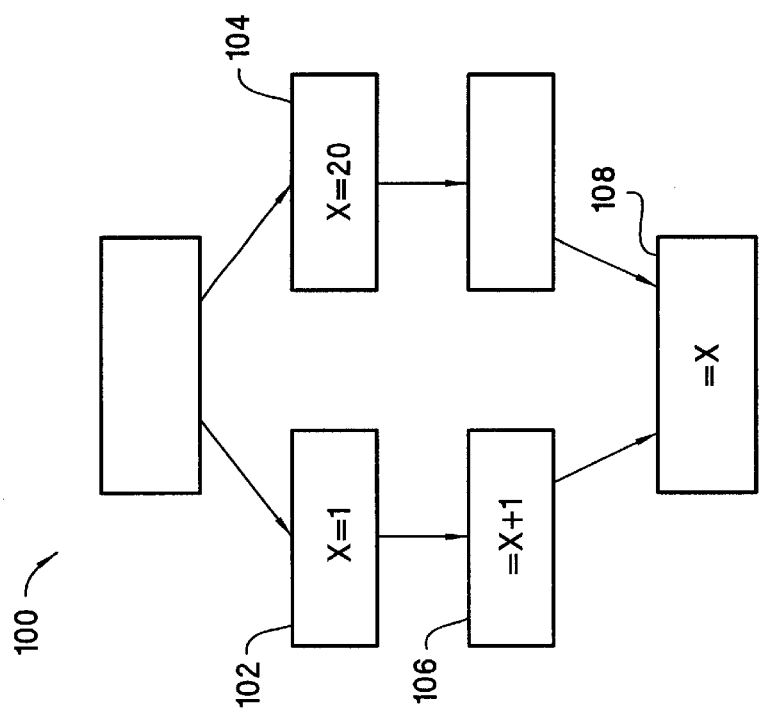
FIG. 1A illustrates a control flow graph representing an exemplary source program in non-SSA form.
Figure 2:
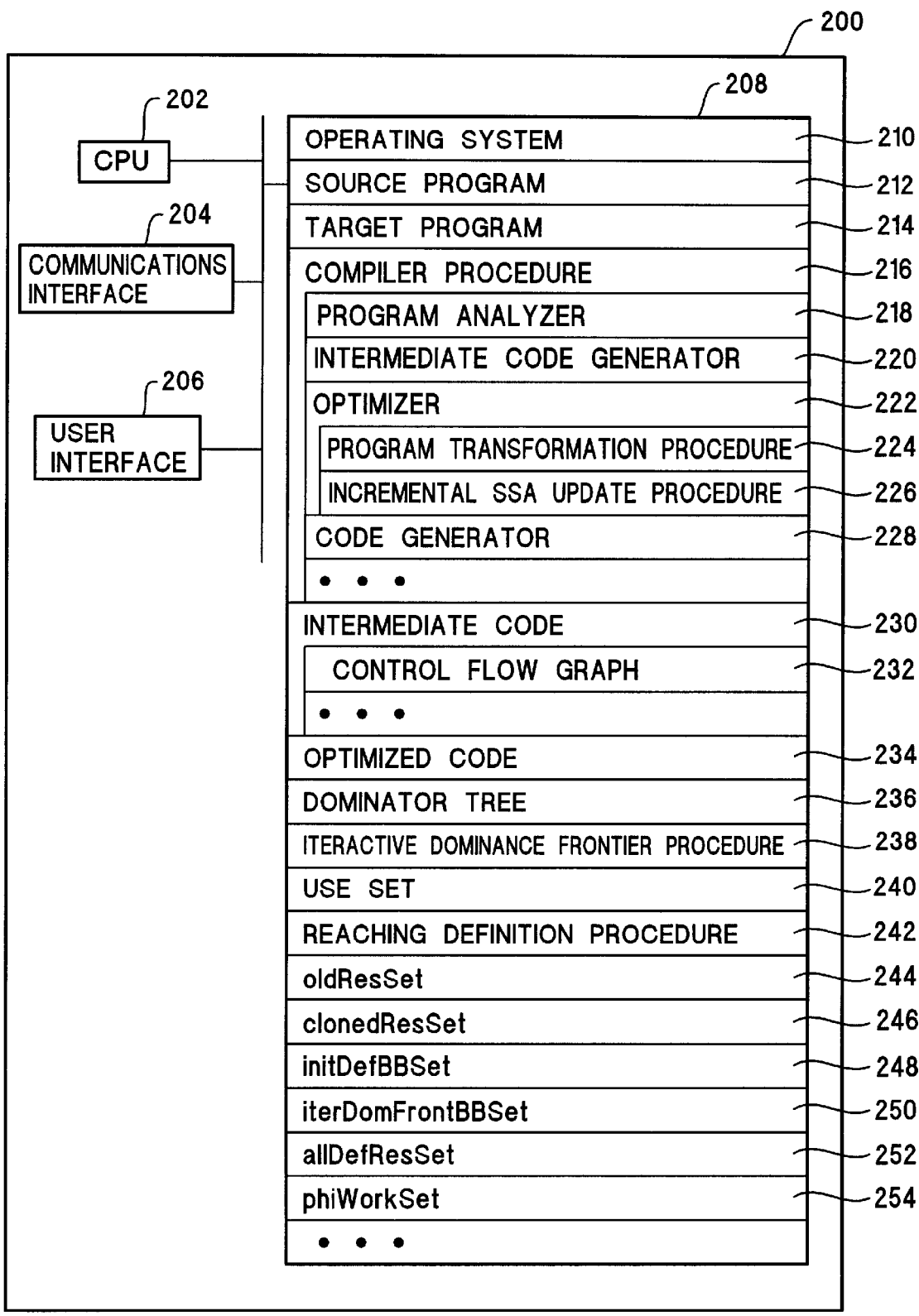
FIG. 2 illustrates a computer system embodying a preferred embodiment of the present invention.

FIG. 2 illustrates a computer system 200 embodying the technology of the present invention. The computer system 200 can be a workstation, personal computer, mainframe, or other type of processing device. The computer system 200 includes a central processing unit (CPU) 202, a communications interface 204, a user interface 206, and a memory 208. The communications interface 204 can be used to communicate with other computers, networks, or system resources. The user interface 206 typically includes a keyboard and a display device, and may include additional resources such as a pointing device and a printer. The memory 208 may be implemented as random access memory (RAM) or a combination of RAM and non-volatile memory such as magnetic disk storage. The computer system 200 has other system resources which are not shown.

The memory 208 can include the following:

an operating system 210;

a source program 212 including source code;

a target program 214;

a compiler procedure 216 that translates the source program 212 into the target program 214;

an intermediate code 230 representing the source program 212 during a compilation process;

an optimized code 234 representing the source program 212;

a dominator tree 236 representing a dominance relationship between the nodes of a control flow graph 232 that represents the source program 212;

an iterative dominance frontier procedure 238 that determines the iterative dominance frontier of a given set of nodes;

a UseSet 240 that indicates the uses of a particular original variable name or cloned variable name;

a reaching definition procedure 242 that determines the closest definition instruction in the dominator tree that reaches a particular node or use instruction;

an oldResSet 244 that includes a set of original variable names that have been cloned due to a program transformation;

a clonedResSet 246 that includes a set of cloned variable names generated by a program transformation;

an initDefBBSet 248 that includes a set of nodes having definitions for the variables found in oldResSet 244 and clonedResSet 246;

an iterDomFrontBBSet 250 that includes a set of nodes that are in the iterative dominance frontiers of the nodes in the set initDefBBSet 248;

an allDefResSet 252 that includes the set of names in the oldResSet 244, the clonedResSet 246, and the cloned variable names defining phi-functions that have been inserted in the nodes that are part of the iterDomFrontBBSet;

a phiWorkSet 254 that includes a set of phi-functions;

as well as other procedures and data structures.

The compiler procedure 216 can include a program analyzer 218, an intermediate code generator 220, an optimizer 222, a code generator 228, as well as other data and procedures not shown. The optimizer 222 can include one or more program transformation procedures 224 and an incremental SSA update procedure 226. The intermediate code 230 can utilize a control flow graph 232 representation of the source program 212.

Figure 3:
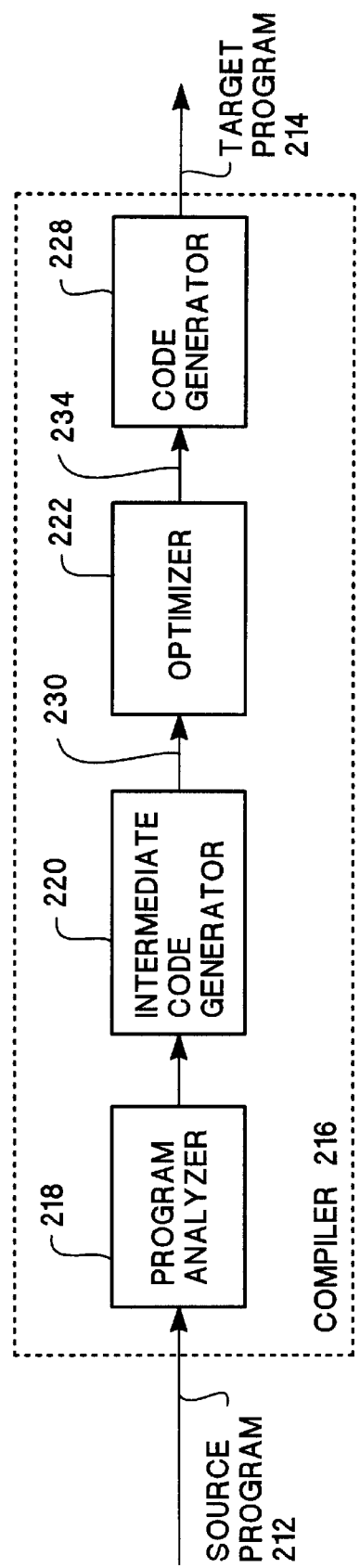
FIG. 3 is a flow chart illustrating the operation of the compiler shown in FIG. 2 in accordance with a preferred embodiment of the present invention.

FIG. 3 illustrates the various phases of the compiler 216. In a typical compilation process, a source program 212 is analyzed by a program analyzer 218. The program analyzer 218 can use any of the well-known program analyses such as but not limited to lexical analysis, syntax analysis, semantic analysis, and the like. The results of the program analyzer 218 are transmitted to the intermediate code generator 220 which generates an intermediate representation of the source program 212, herein referred to as the intermediate code 230. Preferably, the intermediate code 230 is in SSA form whereby there is a single definition for each variable. The intermediate code 230 is transmitted to the optimizer 222 which attempts to improve the intermediate code 234 so that a faster running target program 214 can be generated. The optimized code 230 is then transmitted to the code generator 228 which generates the target program 214. The target program 214 can be relocatable machine code, bytecode, assembly code, object code, or the like. Additional processing by a loader, link-editor, assembler, bytecode verifier, and the like, can be used to generate machine code or any type of executable module that is capable of execution on a target CPU.

Figure 4:
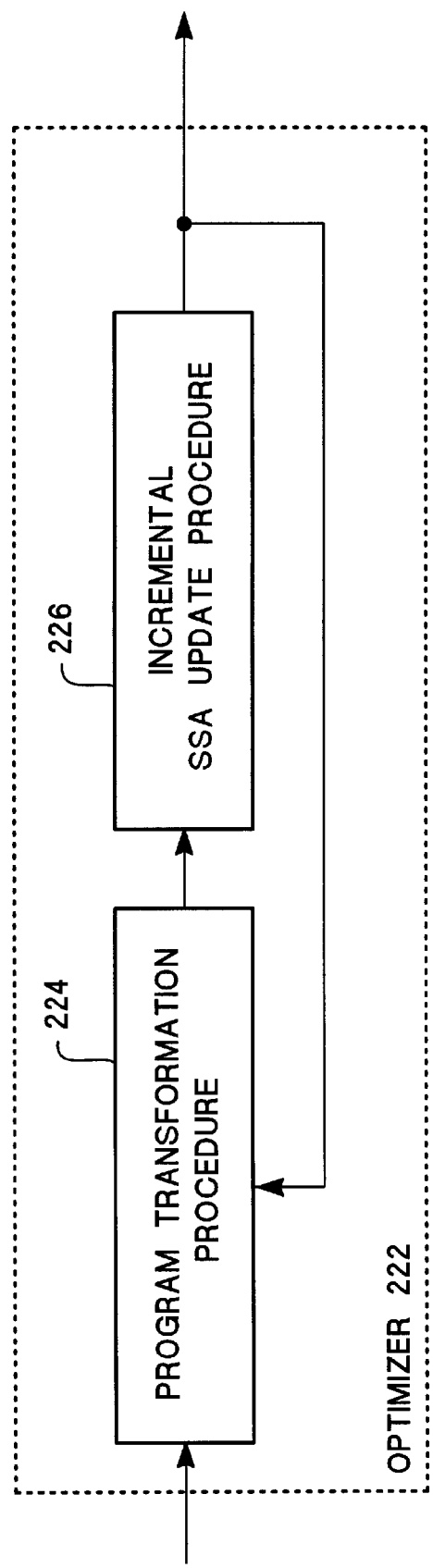
FIG. 4 is a flow chart illustrating the operation of the optimizer shown in FIG. 2 in accordance with a preferred embodiment of the present invention.

FIG. 4 illustrates the optimizer 222. Typically, one or more program transformation procedures 224 are performed on the intermediate code 230. Examples of such program transformation procedures 224 can include any type of optimization procedures such as but not limited to code motion, loop optimization, register promotion, and the like. Each program transformation procedure 224 receives the intermediate code 230 in SSA form. In some cases, a particular program transformation 224 can affect the intermediate code 230 such that it is no longer in SSA form. In these cases the incremental SSA update procedure 226 is executed in order to restore the intermediate code 230 into SSA form. Another program transformation procedure 224 can be performed after the incremental SSA update procedure 226 is executed or the next compilation phase is executed.

The foregoing description has described an exemplary computer system embodying the technology of the present invention. In addition, an overview of the phases of the compiler embodying the technology of the present invention has been described. Attention now turns to the operation of the computer system 200 with particular emphasis on the operation of the incremental SSA update procedure 226 that restores the intermediate code 230 back to SSA form.

The operation of the incremental SSA update procedure 226 will be described below with reference to an exemplary source program shown in FIGS. 5A–5F. However, it should be noted that this example is for illustration purposes only and does not, in any way, limit the present invention to the scenario illustrated in the example. In addition, an exemplary pseudo-code program that implements the incremental SSA update procedure 226 is shown in Appendix A.

Figures 5A, 5B:
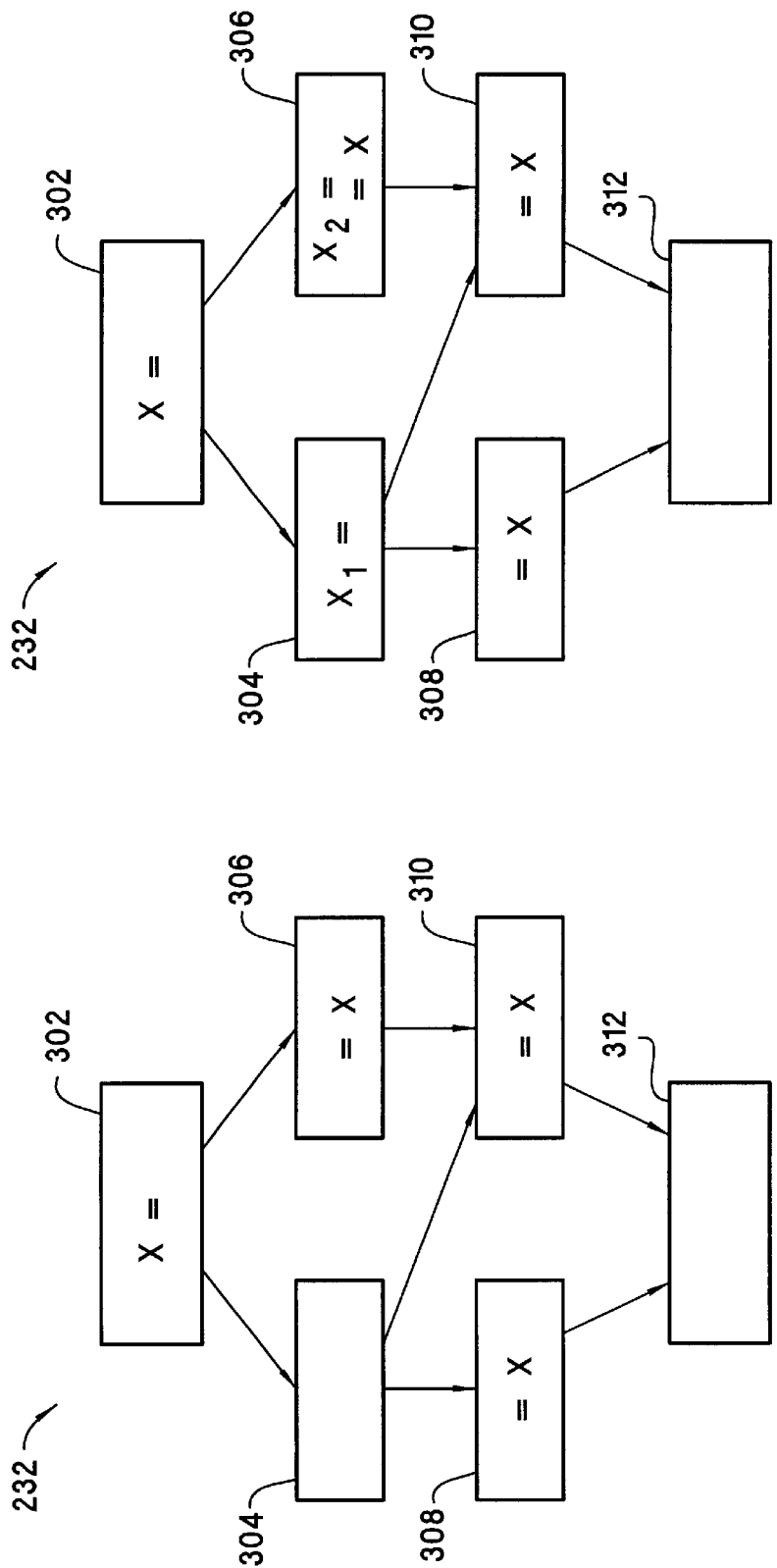

FIG. 5A illustrates a control flow graph 232 which is one of the data structures used to represent the intermediate code representing the source program 212. A control flow graph 232 is a directed graph whose nodes are the basic blocks of the source program 212. The terms "node" and "basic block" will be used interchangeably in this description. A more detailed description of these data structures can be found in Aho, et al., *Compilers Principles, Techniques, and Tools*, Addison-Wesley Publishing Company (1986), Muchnick, *Advanced Compiler Design Implementation*, Morgan Kaufmann Publishers (1997), and Wolfe, *High Performance Compilers For Parallel Computing*, Addison-Wesley Publishing Company (1996) all of which are hereby incorporated by reference as background information.

The control flow graph 232 is in SSA form. The variable x is defined in node 302 and used in nodes 306, 308, 310. As such, there is one definition for x thereby conforming to the SSA form.

The control flow graph 232 shown in FIG. 5B illustrates the results of a program transformation, such as code motion, to the source program represented by the control flow graph in FIG. 5A. The code motion program transformation has generated additional cloned variable name definitions for x which result in the control flow graph violating the SSA form. There is a definition of x in node 302, a definition for cloned variable name $x_1$ in node 304, and a definition for cloned variable name $x_2$ in node 306. There are uses of x in nodes 306, 308, 310. Thus, there are three definitions associated with x which violates the SSA form. The control flow graph 232 is transmitted to the incremental SSA update procedure 226 so that the graph 232 can be restored to SSA form.

Figure 6:
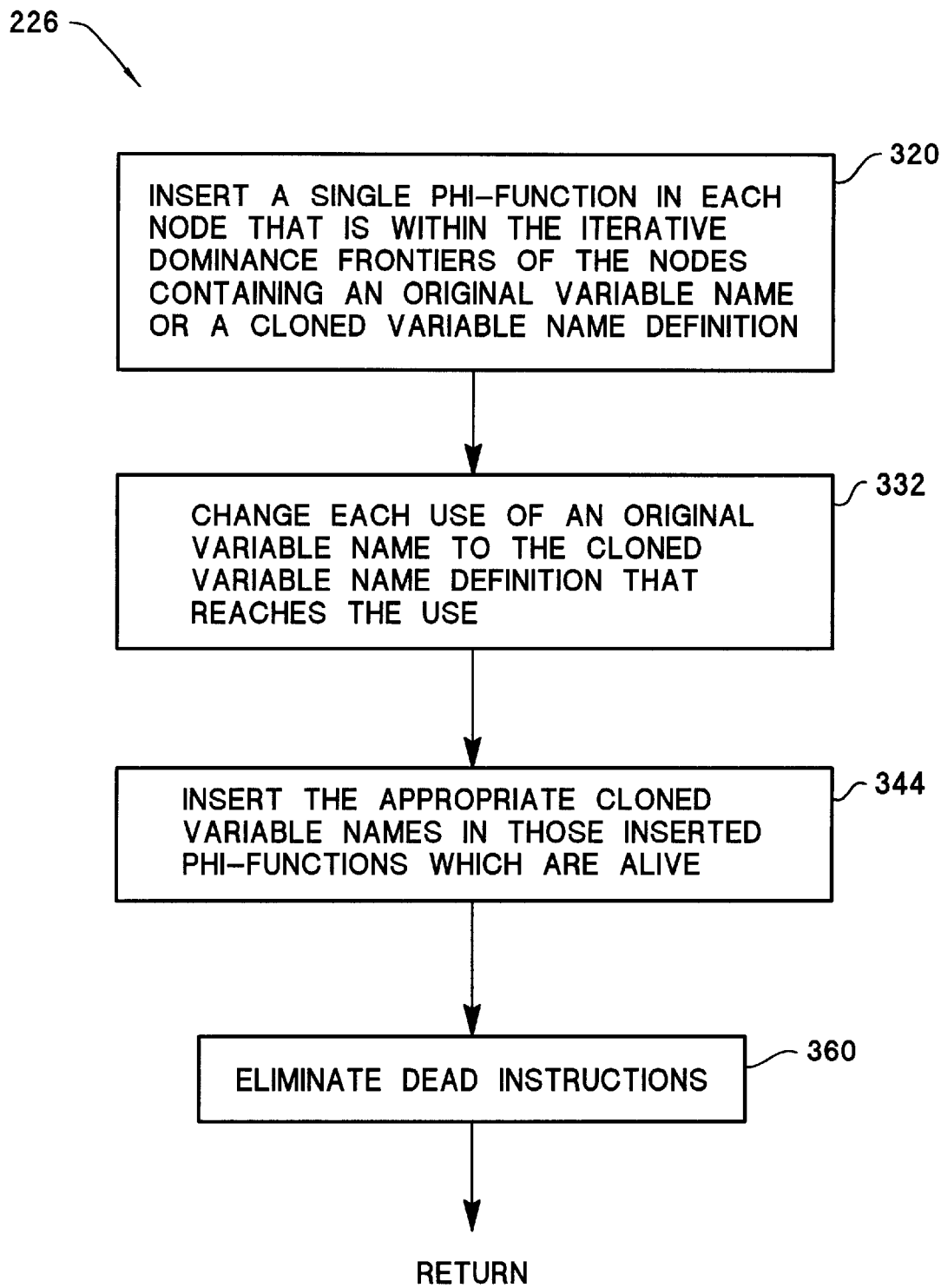
FIGS. 6–10 are flow charts illustrating the incremental SSA update procedure in accordance with a preferred embodiment of the present invention.
Figure 7:
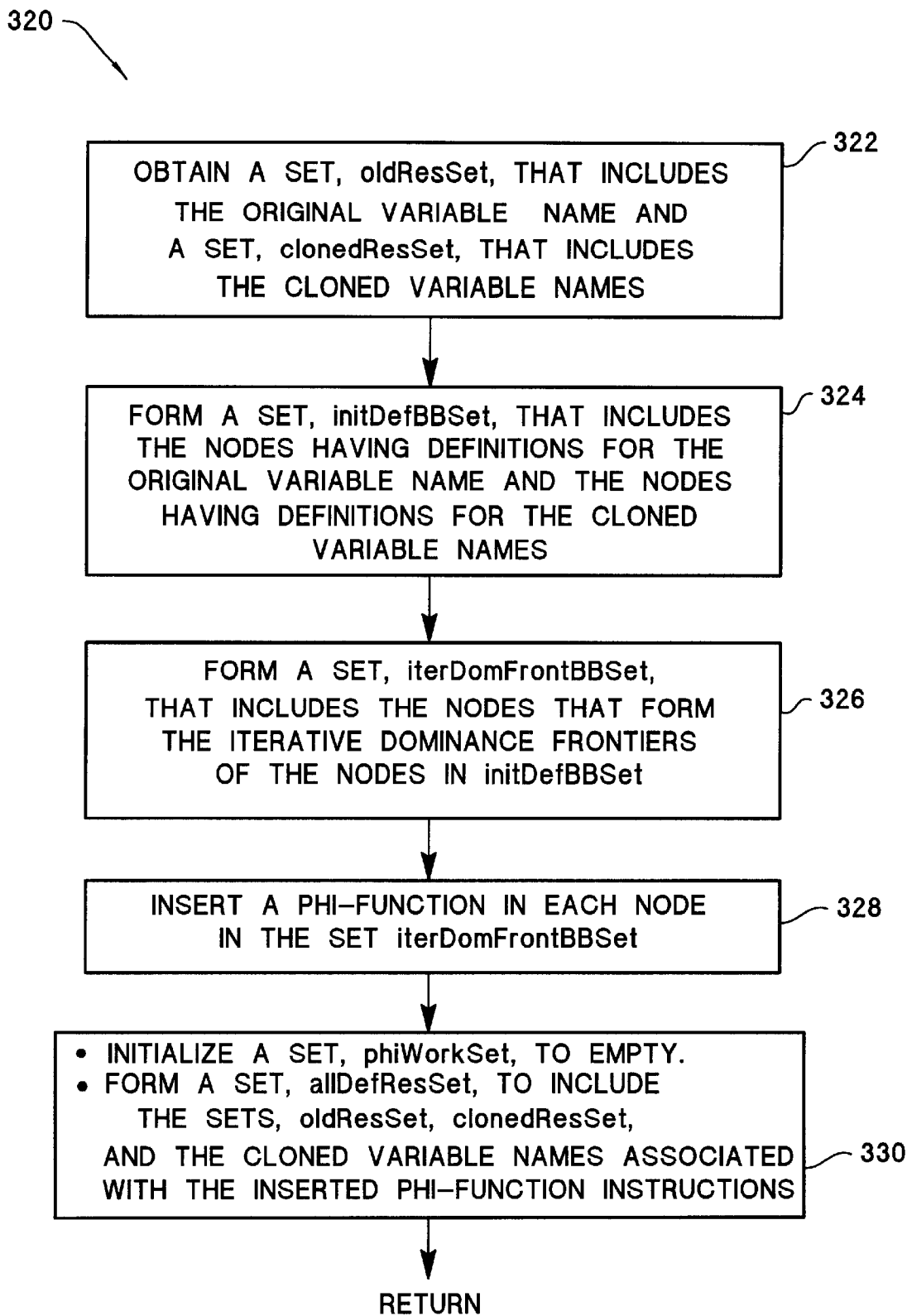

FIG. 6 illustrates the steps used by the incremental SSA update procedure 226. First, a single phi-function is inserted as the first instruction in each node that is within the iterative dominance frontiers of the nodes that contain a cloned variable name or original variable name definition (step 320). FIG. 7 illustrates step 320. Referring to FIG. 7, the incremental SSA update procedure 226 obtains a set of original variable names, referred to as oldResSet 244, which are the variable names that have corresponding cloned variable names (step 322). For the example shown in FIG. 5B, oldResSet 244 includes the variable name x. In addition, the incremental SSA update procedure 226 obtains a set of cloned variable names, referred to as clonedResSet 246, which includes the cloned variable names corresponding to each of the original variable names (step 322). For the example shown in FIG. 5B, clonedResSet, includes the cloned variable names, $x_1$ and $x_2$. Preferably, these sets are generated by the program transformation procedure 224 that executes prior to the incremental SSA update procedure 226 and the sets 244, 246 are passed to the incremental SSA update procedure 226.

Next, another set, referred to as initDefBBSet 248, is formed that includes the nodes having definitions (i.e., definition instructions) for the original variable names found in the set oldResSet 244 and the nodes containing definitions for the cloned variable names found in the set clonedResSet 246 (step 324).

An additional set, iterDomFrontBBSet 250, is formed that includes the nodes that are in the iterative dominance frontiers of the nodes in the set initDefBBSet 248 (step 326). The concept of iterative dominance frontiers is well known in the compiler art and as such will not be discussed in detail. A more detailed description can be found in the incorporated references cited above. Briefly, a node z is considered to be dominated by a node y if the node y is on every path from the start of the control flow graph to node z. If nodes y and z are not the same node, then node z is strictly dominated by y. A node x is within the dominance frontier of a node y if the node y dominates a predecessor of node x and if node y does not strictly dominate x. The iterative dominance frontier for a set of nodes includes the dominance frontiers of each node in the set. A dominator tree 236 can be used to determine the nodes that form the set iterDomFrontBBSet. There are various well-known techniques that can be used to construct the dominator tree 236 and which determine the iterative dominance frontier for a given set of nodes. These techniques can be found in the incorporated references mentioned above. For the example shown in FIG 5B, the set iterDomFrontBBSet 250 includes the nodes 310, 312.

Figure 5D:
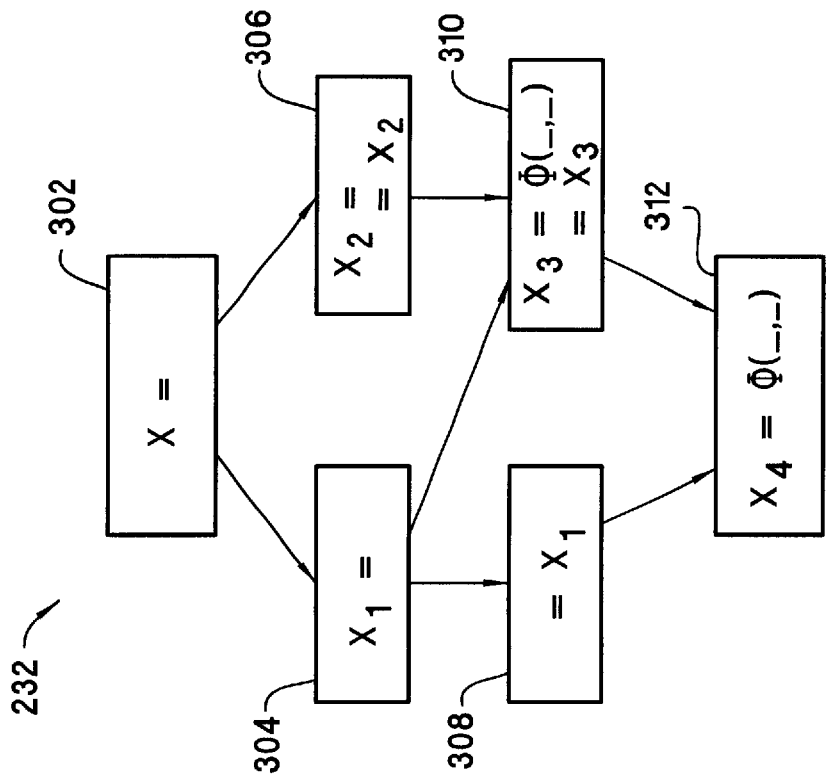
Figure 5C:
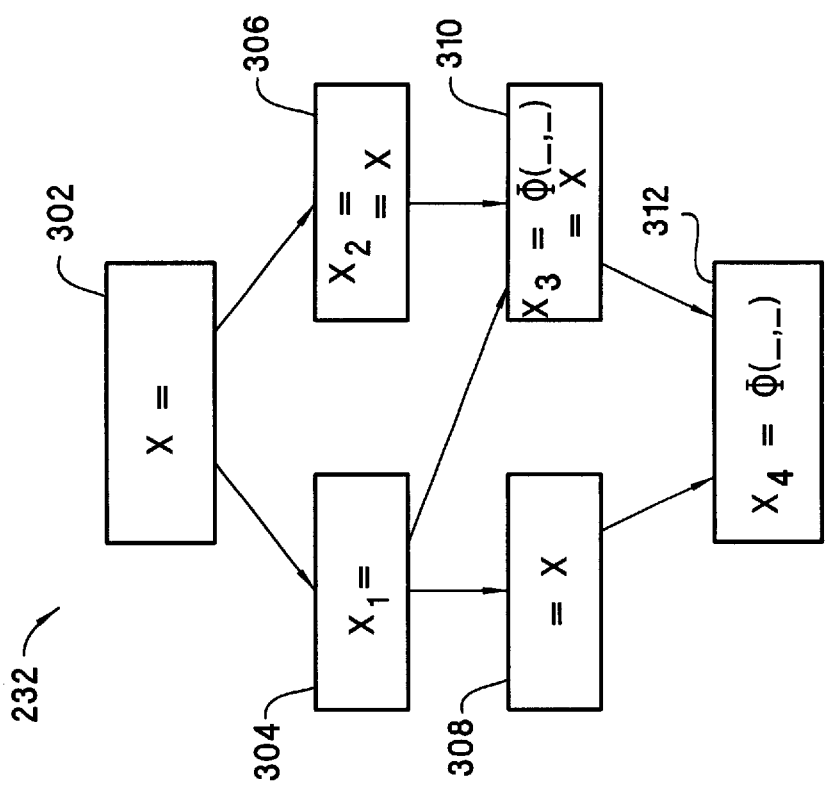

A single phi-function is inserted in each node that is part of the set iterDomFrontBBSet 250 (step 328). The phi-function is a special type of a definition instruction that is used to indicate the multiple definitions that reach the node containing the phi-function. A more detailed discussion of the phi-function can be found in the incorporated references cited above. The value of the phi-function is assigned a cloned variable name. The arguments of the phi-function are left blank and are determined at a later point. FIG. 5C illustrates the exemplary control flow graph 232 including the cloned variable names $x_3$ and $x_4$ in nodes 310, 312 respectively, which are assigned phi-functions.

Next, a set phiWorkSet 254 is initialized to empty and another set, allDefResSet 252, is formed to include the original variable names, the cloned variable names, and the cloned variable names generated in step 328 as a result of inserting the phi-functions (step 330). The use of these sets will be discussed below.

Figure 8:
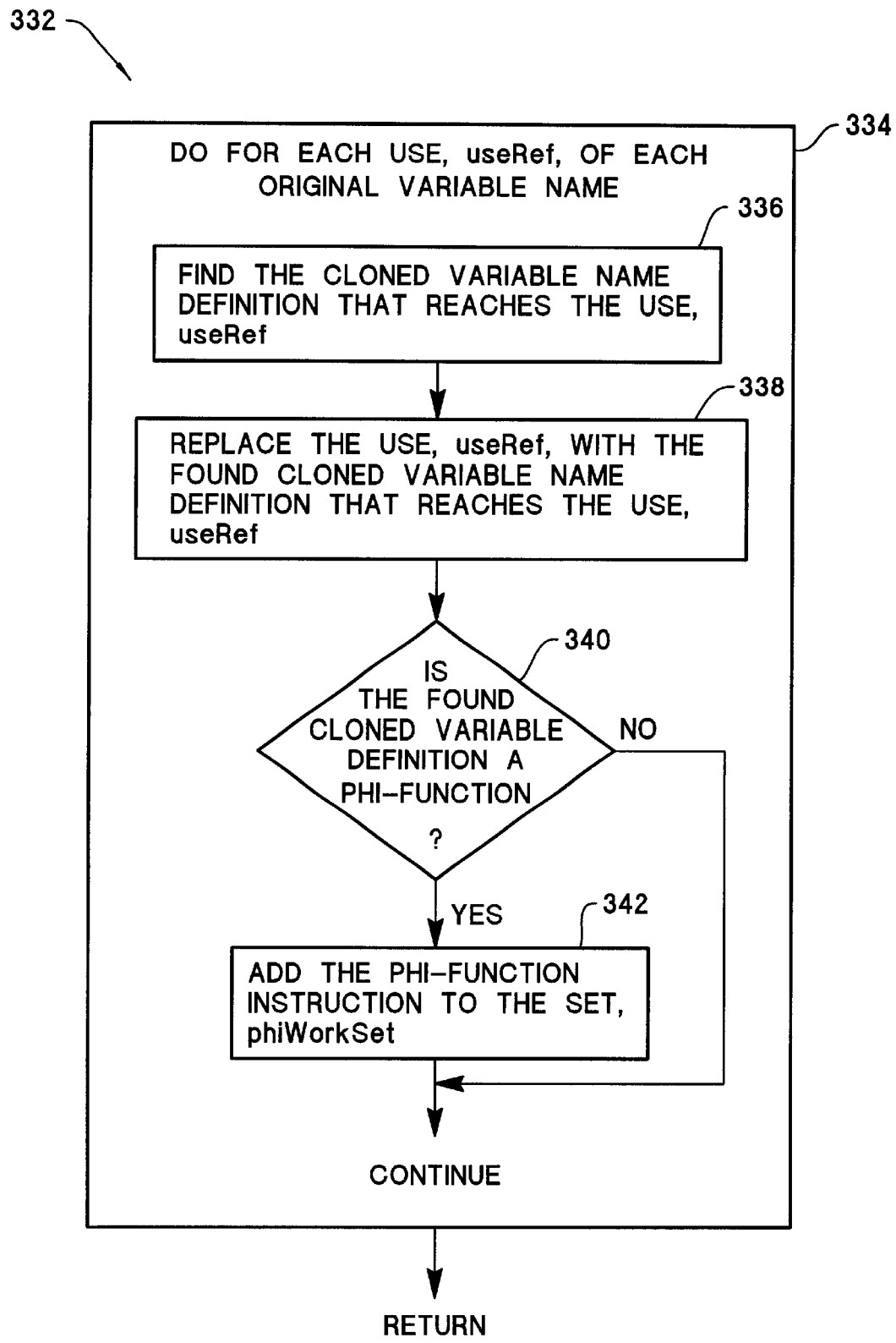

Referring back to FIG. 6, each use of an original variable name is changed to the cloned variable name definition that reaches the use (i.e., use instruction) (step 332). FIG. 8 illustrates step 332 in more detail. Referring to FIG. 8, the incremental SSA update procedure 226 iterates through each use, useRef, of an original variable name (step 334). In order to determine the uses for each original variable name, a UseSet or data structure 240 can be used. The UseSet 240 lists for each variable name, the nodes containing the uses for each variable name including the associated cloned variable name uses. Preferably, the UseSet 240 is constructed before the incremental SSA update procedure 226 is executed. For each use of an original variable name, the procedure 226 finds the cloned variable name that reaches the particular use (step 336). For example, in FIG. 5C, the cloned variable name definition of $x_2$ in node 306 reaches the use of x in node 306 and the cloned variable name definition of $x_3$ in node 310 reaches the use of $x_3$ in node 310. Each use is then replaced with the cloned variable name definition that reaches the use (step 338). This results in the use instructions that are shown in FIG. 5D. If any of the cloned variable name definitions are phi-functions (step 340-Y), these instructions are placed in the set, phiWorkSet 254, for use later on in the procedure 226 (step 342).

Figure 9:
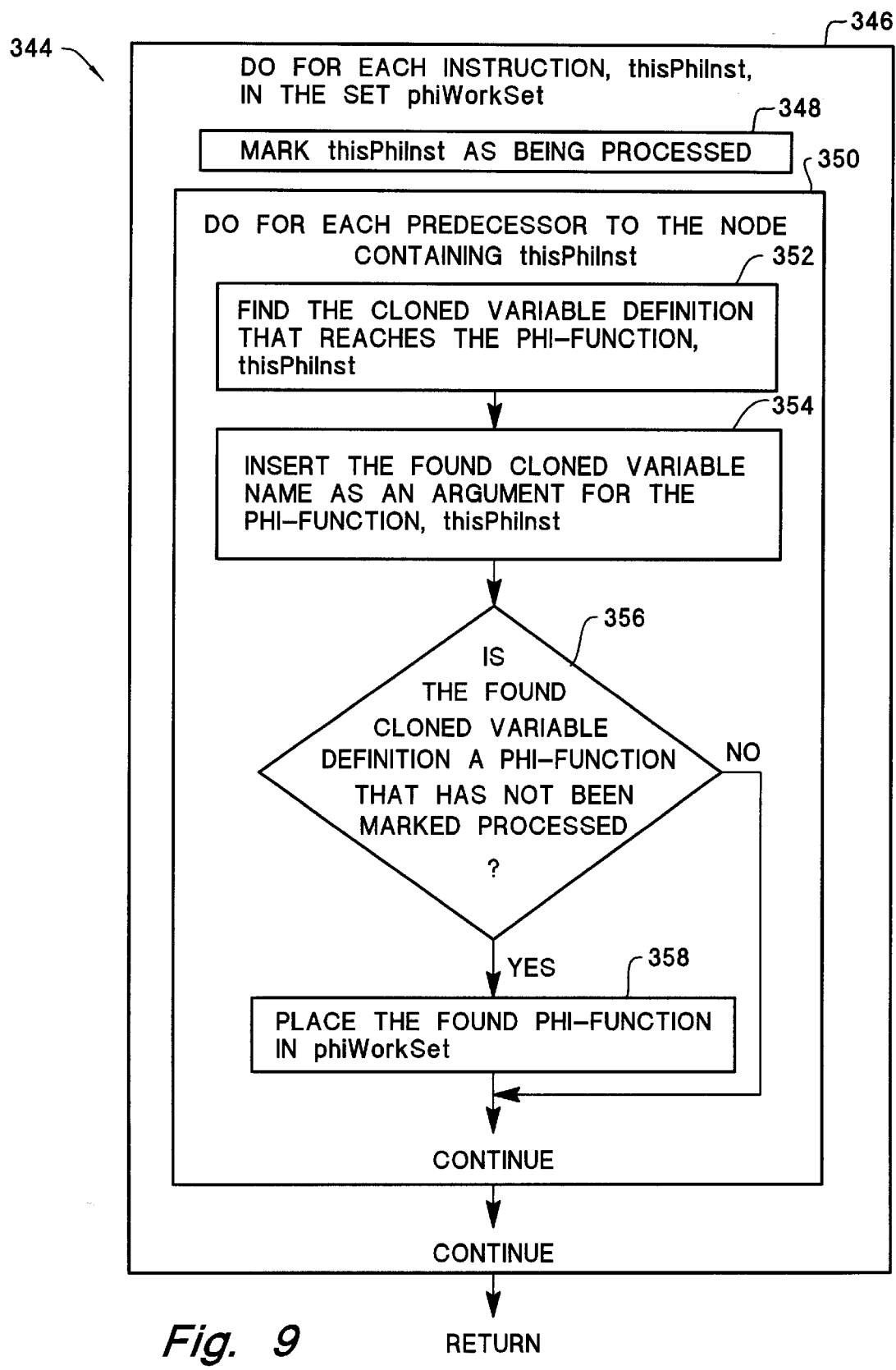

Referring back to FIG. 6, the procedure 226 then proceeds to insert the appropriate cloned variable names as the arguments for the previously inserted phi-functions which are live (step 344). A cloned variable name is live if there is a use of the cloned variable name in a node that succeeds the node where the cloned variable is defined. FIG. 9 illustrates this step in more detail. Referring to FIG. 9, the procedure 226 iterates through each definition instruction, thisPhiInst, that uses a phi-function and which is part of the set, phiWorkSet 254 (step 346). An instruction is then marked as being processed (step 348). The procedure 226 then iterates through each predecessor to the node containing the instruction, thisPhiInst (step 350) in order to find the cloned variable name definition that reaches the instruction, thisPhiInst (step 352). The cloned variable name associated with the closest reaching cloned variable name definition is then inserted as an argument to the phi-function corresponding to the instruction, thisPhiInst (step 354). If the closest reaching definition that is found uses a phi-function and that definition has not been marked processed (step 356-Y), then the instruction is placed in the set phiWorkSet 254 (step 358) in order for the arguments of the found phi-function to be determined as well. The procedure 226 continues considering each predecessor to the node containing thisPhiInst and for each phi-function in the set phiWorkSet.

FIG. 5E shows the result of the application of the steps shown in FIG. 8. The instruction using the phi-function in node 310 is complete with arguments $x_1$ and $x_2$. The procedure 226 did not find the arguments for the phi-function in node 312 since there is no use of the cloned variable $x_4$ after its definition and as such was never placed in the set phiWorkSet 254. This definition will be eliminated in the next step. Thus, the procedure 226 only considers those phi-function definitions that have subsequent uses thereby eliminating unnecessary work and memory space.

Figure 10:
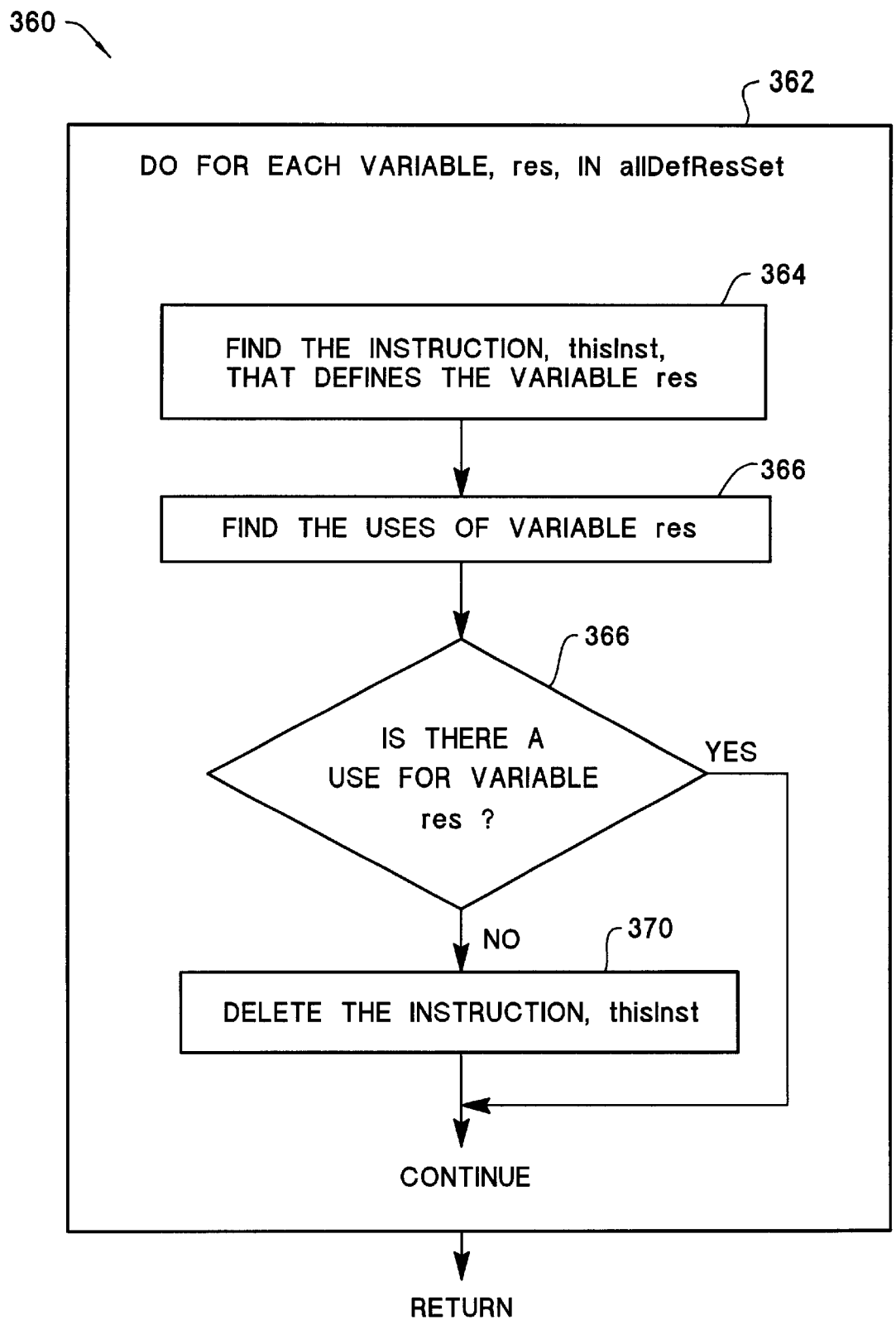

Referring back to FIG. 6, the procedure 226 proceeds to eliminate dead instructions (step 362). A dead instruction is a definition instruction that defines a variable that is not used subsequent to its definition. FIG. 10 illustrates this step in more detail. The set, allDefResSet 252, was formed at the outset of the procedure 226 and includes all the original variable names, the cloned variable names that were inserted by the program transformation procedure 224, and the cloned variable names that correspond to the phi-function definitions that were inserted by the incremental SSA update procedure 226. The procedure 226 iterates for each variable name, res, in the set, allDefResSet 252 (step 362). The instruction that defines a particular variable name, res, is found (step 364) as well as the instructions that use the particular variable name (step 366). The UseSet 240 is used to find the instructions that use a variable name. If there are no uses for a particular variable name (step 368-N), then the instruction is deleted (step 370). Otherwise (step 368-Y), the instruction is not deleted. The procedure 226 proceeds to process each variable name in the set, allDefResSet 252.

The foregoing description has described the operation of the incremental SSA update procedure 226 in accordance with a preferred embodiment of the present invention. This technique is more computational efficient than other incremental SSA update techniques. First, the procedure 226 processes all original variable names and their corresponding cloned variable names simultaneously by using the various sets 244, 246, 248, 250, 252, 254. By processing these names together, the iterative dominance frontier calculation is performed once thereby incurring linear time overhead for all of the name definitions.

Second, the procedure 226 determines the appropriate cloned variable name definitions for those inserted definition instructions that are defined by phi-functions and which are live. The consideration of only the live definition instructions eliminates unnecessary computational expense.

In addition, the elimination of the dead instructions includes dead definition instructions for the original variable names, the cloned variable names, and any inserted cloned variable names defined by use phi-functions. By considering all of these names simultaneously, the procedure 226 guarantees that no new dead instructions remain after the program transformation and the SSA update procedure 226 are executed.

An advantage of each of these above mentioned improvements is a reduction in the compilation time and in the amount of memory space required for the compilation process. This computational efficiency reduces the overhead expense incurred in using the procedure 226 thereby making its use practical for commercial implementations of any compilation or optimization process.

The foregoing description, for purposes of explanation, used specific nomenclature to provide a thorough understanding of the invention. However, it will be apparent to one skilled in the art that the specific details are not required in order to practice the invention. In other instances, well known data structures and procedures are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

It should be noted that the present invention is not constrained to the computer system shown in FIG. 2 and can be practiced without the specific details and may be implemented in various configurations, or makes or models of tightly-coupled processors, in various configurations of loosely-coupled microprocessor systems, and the like.

Further, the method and system described hereinabove is amenable for execution on various types of executable mediums other than a memory device such as a random access memory. Other types of executable mediums can be used, such as but not limited to, a computer readable storage medium which can be any memory device, compact disc, floppy disk, or the like.

The technology of the present invention has been described with respect to program transformations that insert cloned variable names. However, the present invention has wider application than the particular case illustrated herein. One skilled in the art can easily modify the present invention to accommodate the case where a program transformation has introduced a new original variable name with a set of definitions and a set of uses that result in the intermediate code being in non-SSA form. By renaming the definitions, the incremental SSA update procedure 226 can be used to rename each use with a proper new name in order to conform the code to SSA form.

Furthermore, one skilled in the art can easily modify the technology of the present invention to handle the case where the definition of an original variable name or a cloned variable name is deleted.

---

APPENDIX A

```
updateSSAForClonedResourceoldResSet, clonedResSet)
oldResSet: a set of existing resources (of variable names) under
SSA form, where these resources were originally
    renamed from the same name during SSA construction.
clonedResSet: a set of new resources for variable names),
which are cloned from the resources in oldResSet.
{
    // Step 1:
    initDefBBSet = { basic block BB | for every
    resource in oldResSet and cloneResSet, BB is the
    basic block
        where the resource is defined};
    iterDomFrontBBSet = the iterative dominance
    frontier set of initDefBBSet;
    phiTargetResSet = {};
    Place a φ instruction with target resource targetRes
    at each basic block in the iterDomFrontBBSet, and phiTar-
        getResSet += targetRes;
    allDefResSet = oldResSet + clonedResSet +
    phiTargetResSet;
    phiWorkSet = {};
    // Step 2:
    for every use reference useRefof each resource in
    old ResSet
    {
        thisInst = the instruction containing useRef;
        olfRes = the resource in useRef;
        reachingDefRes = computeReachingDef(thisInst,
        allDefResSet);
        if (oldRes != reachingDefRes in useRef;
        if(reachingDefRes is defined by a φ instruction,
        phiInst) {
                phiWorkSet += phiInst;
        }
    }
    // Step 3:
    while ( phiWorkSet != {}) {
        thisPhiInst = a φ instruction retireved and
        removed from phiWorkSet;
        Mark thisPhiInst as live;
        for each predecessor predBB of the basic block
        containing thisPhiInst
        {
            Create a virtual use instruction, useInst, at the
            end of predBB;
            reaching DefRes = computeReachingDef(useInst,
            allDefResSet);
            Place reachingDefRes as source resource in
            thisPhiInst in association with predBB;
            if (reachingDefRes is defined by a φ instruction,
            defPhiInst, and defPhiInst has not been
            marked live)
            {
                phiWorkSet += defPhiInst;
            }
        }
    }
    //Step 4:
    for every resource, res, in allDefResSet
    {
        thisInst = the instruction that defines res;
        (thisInst may be a φ instruction or an instruction
        defining a resource
            from oldResSet or clonedResSet;
        if (there is no use reference of res) delete thisInst;
    }
}
Resource
computeReachingDef(inst, allDefResSet)
{
    currBB = the basic block containing inst;
    if( allDefResSet has a resource, defRes, defined in currBB &&
        defRes is defined by an instruction preceding inst ) {
```

---

APPENDIX A

```
            return defRes;
    }
    Transverse each basic block, thisBB, in the dominator tree from
    currBB toward the root {
            if (a resource, defRes, in allDefResSet is defined at
            thisBB) return defRes;
    }
}
```
Copyright 1998 Hewlett-Packard Company.

---

What is claimed is:

1. A method for transforming a non-SSA code segment into SSA form, said method comprising the steps of:

representing the non-SSA code segment as a plurality of nodes, each node including one or more instructions, a first subset of the instructions including definition instructions that define an original variable name or a cloned variable name, a second subset of the instructions including use instructions that use an original variable name or a cloned variable name, the original variable name associated with at least one or more cloned variable names;

providing a first set of nodes including the nodes having a definition instruction for the original variable name and a definition instruction for each cloned variable name;

forming a second set of nodes including the nodes that are in iterative dominance frontiers of the nodes in the first set;

inserting in each node in the second set, a single definition instruction that defines a cloned variable name that is assigned a phi-function;

altering the original variable name, in each use instruction that uses the original variable name, to a variable name associated with a definition instruction that reaches the use instruction that uses the original variable name; and updating each phi-function with cloned variable names having definition instructions that reach a particular phi-function.

2. The method of claim 1, further comprising the step of:
eliminating definition instructions that are not associated with a subsequent use instruction.

3. The method of claim 2, further comprising the step of:
generating an executable module from the non-SSA code segment for execution on the computer.

4. The method of claim 2,
the eliminating step further comprising the steps of:
forming a third set of variable names including the original variable name and all associated cloned variable names;
finding each definition instruction that defines the names in the third set; and
eliminating each found definition instruction that does not have an associated use instruction.

5. The method of claim 1, further comprising the step of:
prior to the representing step, executing a program transformation that generates at least one definition instruction that defines a cloned variable name that is associated with the original variable name.

6. The method of claim 1,
the forming step further comprising the steps of
providing a dominance data structure indicating a dominance relation between the nodes;

using the dominance data structure to determine the iterative dominance frontiers of the nodes in the first set; and including the nodes in the iterative dominance frontier in the second set.

7. The method of claim 1, the altering step further comprising the steps of:
(i) searching for use instructions that use the original variable name;
(ii) for each use instruction found in step (i), finding definition instructions for cloned variable names that reach each use instruction found in step (i); and
(iii) replacing the original variable name in each found use instruction with the cloned variable name found in step (ii).

8. The method of claim 1, the updating step further comprising the steps of:
(i) finding one or more definition instructions that use live phi-functions;
(ii) for each node containing a definition instruction found in step (i), traversing each predecessor node for each definition instruction that defies a cloned variable name that reaches the definition instruction found in step (i); and
(iii) inserting the cloned variable name found in step (ii) in the phi-function found in step (i).

9. An apparatus for transforming a non-SSA code segment into SSA form comprising:

a representation of the non-SSA code segment including a plurality of nodes, each node including one or more instructions, a first subset of the instructions including definition instructions that define an original variable name or a cloned variable name, a second subset of instructions including use instructions that use an original variable name or a cloned variable name, the original variable name associated with at least one cloned variable name;

a first executable procedure including instructions that:
insert a single phi-function into each node that is within the iterative dominance frontier of each node having a definition instruction that defines the original variable name and each associated cloned variable name;
change the original variable name in each use instruction that uses the original variable name associated with a definition instruction that reaches the use instruction; and
update each inserted phi-function with cloned variable names having definition instructions that reach a particular inserted phi-function instruction.

10. The apparatus of claim 9, the first executable procedure further including instructions that
eliminate definition instructions associated with the original variable name and the associated cloned variable names that are not associated with a subsequent use instruction.

11. The apparatus of claim 9, further comprising:

an executable module based on the instructions in the nodes for execution on a computer.

12. The apparatus of claim 9, further comprising:

one or more program transformation procedures that insert into the non-SSA code segment one or more definition instructions that define cloned variable names.

13. The apparatus of claim 9, further comprising:

a first set of names including each original variable name and the cloned variable names;

a second set of nodes including nodes having definition instructions for each name in the first set; and a third set of nodes including nodes that are part of iterative dominance frontiers to the nodes in the second set.

14. The apparatus of claim 9, further comprising:

a second executable procedure that determines the iterative dominance frontiers of the nodes in the third set.

15. The apparatus of claim 9, further comprising:

a use data structure representing use instructions that use each original variable name and each cloned variable name;

wherein the first executable procedure further includes instructions that use the use data structure to determine the use instructions that are associated with the original variable name or a cloned variable name.

16. The apparatus of claim 9, further comprising:

a third executable procedure including instructions that determine the definition instructions that reach a particular use instruction.

17. A computer readable storage medium for use in a computer system, said apparatus comprising:

a representation of a source program including a plurality of nodes, each node including one or more instructions, a first subset of the instructions including definition instructions that define an original variable name or a cloned variable name, a second subset of instructions including use instructions that use an original variable name or a cloned variable name, the original variable name associated with at least one cloned variable name;

a first executable procedure including instructions having a capability to:
insert a single phi-function into each node that is within the iterative dominance frontiers of each node having a definition instruction that defines the original variable name and each associated cloned variable name;
change the original variable name in each use instruction that uses the original variable name associated with a definition instruction that reaches the use instruction; and
update each inserted phi-function with cloned variable names having definition instructions that reach a particular inserted phi-function instruction.

18. The apparatus of claim 17, the first executable procedure further including instructions that
eliminate definition instructions associated with the original variable name and the associated cloned variable names that are not associated with a subsequent use instruction.

19. The apparatus of claim 17, further comprising:

an executable module based on the instructions in the source program representation for execution on a computer.

20. The apparatus of claim 17, further comprising:

one or more program transformation procedures having a capability to insert into the source program representation one or more definition instructions that define cloned variable names.

21. The apparatus of claim 17, further comprising:

a first set of names including each original variable name and the cloned variable names;

a second set of nodes including nodes having definition instructions for each name in the first set; and a third set of nodes including nodes that are part of iterative dominance frontiers to the nodes in the second set.

22. The apparatus of claim 17, further comprising:

a second executable procedure having a capability to determine the iterative dominance frontiers of the nodes in the third set.

23. The apparatus of claim 17, further comprising: a use data structure representing use instructions that use each original variable name and each cloned variable name; wherein the first executable procedure further includes instructions having a capability to use the use data structure to determine the use instructions that are associated with the original variable name or a cloned variable name.

24. The apparatus of claim 17, further comprising:

a third executable procedure including instructions having a capability to determine the definition instructions that reach a particular use instruction.

* * * * *